(12) United States Patent
Günter

(10) Patent No.: US 9,393,877 B2
(45) Date of Patent: Jul. 19, 2016

(54) METHOD FOR PERFORMING AT LEAST ONE COMPUTATION PROCESS IN A MOTOR VEHICLE, AND MOTOR VEHICLE

(71) Applicant: AUDI AG

(72) Inventor: Christian Günter, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/398,366

(22) PCT Filed: Feb. 14, 2013

(86) PCT No.: PCT/EP2013/000426
§ 371 (c)(1),
(2) Date: Oct. 31, 2014

(87) PCT Pub. No.: WO2013/164045
PCT Pub. Date: Nov. 7, 2013

(65) Prior Publication Data
US 2015/0088352 A1    Mar. 26, 2015

(30) Foreign Application Priority Data

May 3, 2012   (DE) .......................... 10 2012 008 978

(51) Int. Cl.
*B60L 11/18* (2006.01)
*G06F 1/26* (2006.01)
(Continued)

(52) U.S. Cl.
CPC ......... *B60L 11/1816* (2013.01); *B60L 11/1846* (2013.01); *G06F 1/26* (2013.01); *H02J 7/00* (2013.01); *H04L 67/10* (2013.01); *H04L 67/141* (2013.01); *B60L 2240/625* (2013.01); *B60L 2240/627* (2013.01); *B60L 2240/70* (2013.01); *B60L 2260/52* (2013.01); *Y02T 10/7005* (2013.01); *Y02T 10/7072* (2013.01);
(Continued)

(58) Field of Classification Search
None
See application file for complete search history.

(56) References Cited

U.S. PATENT DOCUMENTS 6,564,261 B1 * 5/2003 Gudjonsson ........ H04L 12/1818
370/261
2002/0188384 A1 * 12/2002 Becker .................. G06F 9/5072
701/1

(Continued)

FOREIGN PATENT DOCUMENTS

CN    102161318    8/2011
DE    102009045711    4/2010
(Continued)

OTHER PUBLICATIONS

Translation of DE 102014100569A1. Obtained from ESPACENET on Mar. 30, 2016.*
(Continued)

*Primary Examiner* — John R Olszewski
*Assistant Examiner* — Jeffrey Boomer
(74) *Attorney, Agent, or Firm* — Henry M. Feiereisen LLC

(57) ABSTRACT

A method for performing at least one computation process in a motor vehicle having an electric motor and an energy store associated therewith, wherein during a charging process for the energy store a communication link to at least one further motor vehicle that is in the charging process is set up, with computation devices of the connected motor vehicles being used as a distributed computer system for performing the computation process.

8 Claims, 1 Drawing Sheet

(51) Int. Cl.
*H02J 7/00* (2006.01)
*H04L 29/08* (2006.01)
*H02J 7/04* (2006.01)

(52) U.S. Cl.
CPC ............ *Y02T10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 2006/0038445 A1* | 2/2006 | Yanagida | H04B 3/548 307/1 |
| 2008/0052145 A1 | 2/2008 | Kaplan | |
| 2008/0077286 A1* | 3/2008 | Oyobe et al. | 701/22 |
| 2008/0281663 A1 | 11/2008 | Hakim | |
| 2010/0141205 A1 | 6/2010 | Tyler et al. | |
| 2010/0204863 A1* | 8/2010 | Sakamoto | B60K 6/445 701/22 |
| 2010/0268411 A1* | 10/2010 | Taguchi | B60L 11/1809 701/31.4 |
| 2011/0025267 A1* | 2/2011 | Kamen | B60L 8/003 320/109 |
| 2011/0109266 A1 | 5/2011 | Rossi | |
| 2011/0148353 A1* | 6/2011 | King | B60L 7/12 320/109 |
| 2011/0215758 A1 | 9/2011 | Staehlin | |
| 2011/0241619 A1* | 10/2011 | Young et al. | B60L 11/005 320/109 |
| 2011/0246252 A1 | 10/2011 | Uesugi | |
| 2012/0112697 A1* | 5/2012 | Heuer | B60L 11/1818 320/109 |
| 2012/0277927 A1* | 11/2012 | Watkins et al. | 700/292 |
| 2013/0024060 A1* | 1/2013 | Sukkarie | H04L 67/12 701/22 |
| 2013/0148746 A1* | 6/2013 | Vedantham | H04B 3/54 375/257 |
| 2013/0211988 A1* | 8/2013 | Dorn | B60L 11/1838 705/35 |
| 2013/0257345 A1* | 10/2013 | Nosaka | B60L 11/1816 320/106 |
| 2013/0278225 A1* | 10/2013 | Dietze | B60L 11/1862 320/137 |
| 2013/0290424 A1* | 10/2013 | Joo | H04W 4/203 709/204 |
| 2015/0117556 A1* | 4/2015 | Nii | H04B 3/56 375/257 |
| 2015/0306967 A1* | 10/2015 | Cohen | B60L 11/1822 701/32.3 |

FOREIGN PATENT DOCUMENTS

| | | | | |
|---|---|---|---|---|
| DE | 102011086903 | | 5/2012 | |
| DE | 102014100569 A1 | * | 7/2015 | ......... G01C 21/3453 |
| EP | 2 402 205 | | 1/2012 | |
| WO | WO 2009/014228 | | 1/2009 | |

OTHER PUBLICATIONS

International Search Report issued by the European Patent Office in International Application PCT/EP2013/000426 on Feb. 14, 2013.
Chinese Search Report issued by the Chinese Patent Office in Chinese Patent Application No. 2013800232712 on Dec. 4, 2015.
English translation of Chinese Search Report issued by the Chinese Patent Office in Chinese Patent Application No. 2013800232712 on Dec. 4, 2015.

* cited by examiner

METHOD FOR PERFORMING AT LEAST ONE COMPUTATION PROCESS IN A MOTOR VEHICLE, AND MOTOR VEHICLE

CROSS-REFERENCES TO RELATED APPLICATIONS

This application is the U.S. National Stage of International Application No. PCT/EP2013/000426, filed Feb. 14, 2013, which designated the United States and has been published as international Publication No. WO 2013/164045and which claims the priority of German Patent Application, Serial No. 10 2012 008 978.3, filed May 3, 2012, pursuant to 35 U.S.C. 119(a)-(d).

BACKGROUND OF THE INVENTION

The invention relates to a method for performing at least one computation process in a motor vehicle with an electric motor and an energy store associated therewith. In addition, the invention relates to a motor vehicle suitable for carrying out the method.

In modern motor vehicles, an increasing volume of measurement data is recorded to determine suitable output data for the driver and for vehicle systems by using ever more precise and targeted evaluation processes. Increasingly, computationally intensive computation processes must therefore be performed during the operation of the vehicle. Examples therefor are the exact evaluation of measurement data recorded during the operation of the motor vehicle, in particular camera data and the like, exact range calculations, updating of system data of specific motor vehicle systems, for example of a navigation system, and the like.

These processes are very energy-intensive, which adversely affects the range of motor vehicles, particularly those with an electric motor. To perform the computationally intensive tasks, the size of computing devices of the motor vehicle must in many aspects be increased, resulting in increased costs as well as increased energy consumption. This has an extremely negative effect on the price and the range already viewed as critical, especially in the field of electric vehicles.

SUMMARY OF THE INVENTION

It is therefore an object of the invention to make it possible to perform computationally intensive computation processes even on small-scale computing devices and to minimize the energy consumption of an electric vehicle during its operation.

The published patent application DE 10 2011 086 903 A1 relates to an apparatus for estimating electricity demand of a vehicle, an apparatus processing electricity information and a charging system. To this end, in order to more accurately estimate the electric power consumption of a vehicle based on a schedule of the vehicle, the processing load for estimating the electric energy required for a trip with the vehicle is to be divided between a base station and several vehicles. In this case, a standard vehicle has a standard electrical energy consumption, which is provided to a standard vehicle by a service center. The standard vehicle calculates an electricity demand by estimation, taking into account the standard energy consumption.

To achieve this object, the invention provides that with this method of the aforementioned type, a communication link with at least one other motor vehicle in the loading process is established during a charging process of the energy store, wherein computing devices of the connected motor vehicle are used as a distributed computer system for executing the computation process, wherein the communication link is established via the power supply line to the energy store.

Particularly electric motor vehicles spend a long time in a charging process, which makes it possible in principle to perform computation processes outside the operation of the motor vehicle. In particular, since under purely statistical considerations, a plurality of electric vehicles is always being charged, it is also possible to combine, when performing computationally intensive computation processes, the computing power of various motor vehicles in the charging process by establishing a communication link, which allows to combine the various computing devices to a distributed computer system on which the predetermined computationally-intensive computation processes can be executed. Computationally-intensive tasks are therefore limited to the charging process of the motor vehicle and computed in a motor vehicle distributed computer system, meaning that the required computing power is divided amongst the computational resources of the computing devices of the involved vehicles that are currently being charged.

In this manner, energy can be saved during the operation of the motor vehicle, which is then available for control and/or drive mechanisms during the travel. The size of the computing devices of the motor vehicles can be reduced, since a single computing device never needs to perform the complex, computationally intensive task alone, namely the computation process. Indirectly, it is thus possible with the method according to the invention to extend the range of electric motor vehicles and to reduce the cost of electric motor vehicles, because more favorable computing devices can be used and the energy consumption can be reduced during operation.

It is contemplated that the communication link to the energy store is established via the power supply line, in particular by modulating information. The motor vehicle can always establish a communication link over the corresponding power lines when it is connected to an external power supply. Such methods where information can be transmitted through modulation over power lines are already known in the art and can in principle advantageously be used as part of the method according to the invention. In this way, other complex, in particular wired transmission paths are no longer required.

Alternatively, however, in an embodiment not related to the present invention, the communication link may be set up wired and/or at least partially wirelessly. It is also conceivable to provide, for example, a special connecting cable, which may be, for example, integrated in a power cable, in order to establish the communication link via another line in addition to the power line. However, the communication link is preferably set up at least partially wirelessly, wherein the motor vehicle can connect at the charging site to a network, for example, via WLAN. Of course, other communication links via radio are also possible, because suitable interfaces in this regard are already available in most modern motor vehicles.

In another embodiment of the present invention, a server that is not dedicated to a particular motor vehicle may be used to form and/or control the distributed computer system. It is also conceivable that the communication link between the computing devices is implemented indirectly by a server or at least controlled by a server, i.e. a central processing device that can take over the formation and control of the distributed computer system. The server, which is implemented independent of a particular motor vehicle and is always available, thus coordinates the distributed computer system or optionally the plurality of distributed computer system. Conventional architectures for forming distributed computer systems can also be used in the context of the present invention.

Advantageously, the server may render anonymous the data to be exchanged as part of the computation process. This can adequately protect the privacy by rendering anonymous inquiries, processed data and/or data to be processed and the like, which are transmitted within the distributed computer system, so that, for example, due to the formation of the distributed computer system, an owner of a motor vehicle can not reconstruct the routes driven by an owner of another motor vehicle of the distributed computer system, and the like.

Furthermore, only vehicles from a single manufacturer and/or of a single type and/or motor vehicles located in a specific geographic area may be connected in a distributed computer system. By combining only vehicles from a single manufacturer and/or of a single type in a distributed computer system, it can be ensured that all the required functionalities, in particular program means and algorithms, can be made available by the computing devices of the other vehicles of the distributed computer system. A manufacturer may intentionally design the computing devices so that certain computing processes, in particular manufacturer-specific and/or type-specific computing processes, can be optimally performed in a distributed computer system formed during the charging process. In other words, the computer devices of the motor vehicles to be connected in a cluster are formed or configured so as to be operational in the distributed computer system.

In the context of the present invention, it may also be advantageous to combine in a distributed computer system only motor vehicles located in a specific geographic area. This is especially useful when various motor vehicles contribute data to the computation process, in particular data relating to the region itself, which will be discussed in more detail below. In particular, when a common data base of several vehicles is used for a computation process, the geographical region may advantageously be defined by a current range of the motor vehicle. Therefore, mainly the data originating from locations within its range are relevant for the motor vehicle, so that the range is a criterion which can be considered to form distributed computer systems by taking into account the geographical location of vehicles. In particular, motor vehicles having data relevant for the other vehicles are connected in a distributed computer system.

The computation process may include, for example, post-processing of measurement data recorded during a trip and/or a range calculation and/or an estimate of data for a future trip. For example, measurement data recorded during a trip may be post-processed, in particular data requiring more complex post-processing, such as image processing. For example, for making available improved information to a vehicle system, such as improved annotated map data for a navigation system, images captured with a camera of the vehicle may be evaluated during the charging process with high precision, in order to draw conclusions about changes or special features of a traveled route and to optionally allow updating of system data. A range calculation can also be carried out as a computation process with high precision, because it is known that many, particularly exact algorithms for range calculation require an extremely high computational effort and can therefore be actually used only on a limited scale, in particular when real-time information is required. With the present invention, a highly accurate range estimate can now be generated and provided during the charging process at least for the currently available energy. Finally, forecasts may be made, for example, when a next destination is already known and forecasts should be made in this regard. It should also be mentioned here that the computing processes may, of course, also include preparatory computation processes making determinations that do not depend on current data, thus reducing the complexity or the required computing power of a computation process to be carried out later, particularly in real-time.

In this context, a less accurate analysis of the measurement data may take place during a trip of the vehicle, with a more accurate evaluation following as part of the computation process. Accordingly, an evaluation that requires less processing power, but is slightly less accurate may be performed during the operation of the motor vehicle, which can then be ultimately rendered more precise in the computation process in the distributed computer system during the charging process by sharing computing services of other motor vehicles.

As already mentioned, according to a particularly advantageous embodiment of the present invention, at least one computation process using data, in particular measurement data, from several vehicles may be used. This then produces a common database, which can be evaluated in the context of the computation process. For example, data from a navigation system and/or measurement data forming the basis for a range calculation may be updated by taking into consideration data from other vehicles. It may moreover be prudent or advisable to use the results of the computation process for several motor vehicles containing distributed computer systems, for example, when similar or identical vehicle systems are available that can all use this information. For example, in the context of the present invention, the most current measurement data may always be evaluated for specific locations, for example by evaluating incline profiles from current measurement data of another motor vehicle or it may be concluded by comparing camera images from one motor vehicle with more recent camera images from another motor vehicle that new road signs were erected, a construction site is present, and the like.

This embodiment of the method according to the invention therefore offers in not only the ability to share and commonly use computing power, but also to expand the database with corresponding data of other motor vehicles, thus creating a common data base of motor vehicles of a distributed computer system in a charging process. In this context, the motor vehicle may advantageously record all available sensor data and store these data as measurement data in an internal storage device which the computer device and thus also the entire distributed computer system can access. These data may, for example, be measurement data from a GPS sensor, an angle sensor, an acceleration sensor, performance data (consumption/gain), measurement data of a directional sensor, data from sensors for environmental conditions (temperature, barometric pressure, relative humidity), data from sensors for triggering airbag deployment, camera data (images), weight sensors for the load and the like.

Regarding updating data of a navigation system and/or from a range calculation, the update can be performed based on locations reachable within the current range of the motor vehicle. Thus, the information will mainly be updated that may be relevant for the next trip within the current range of the motor vehicle. This further reduces the required processing power, in that only necessary data are processed.

In addition to the method, the present invention also relates to a motor vehicle, with an electric motor, an energy store associated therewith, a computing device and means for establishing a communication link for carrying out the method according to the invention. The motor vehicle is therefore suitable to be used in the context of the method according to the invention, because the computing device and the corresponding means for establishing a communication link during the charging process are already available, so that the distributed computer system can be formed in order to perform computation-intensive computation processes. For this purpose, for example suitable computer programs may reside on the computing device, and the required hardware components for establishing the communication link may be provided. Together with other motor vehicles, the computing power of a computation process may thus be distributed across several computing devices and, in particular, a common data base may be created, in particular regarding updating data of a navigation system or the like.

BRIEF DESCRIPTION OF THE DRAWING

Further advantages and details of the present invention will become apparent from the exemplary embodiments described hereinafter and with reference to the drawings. The drawings show in.

DETAILED DESCRIPTION OF PREFERRED EMBODIMENTS

Figure 1:
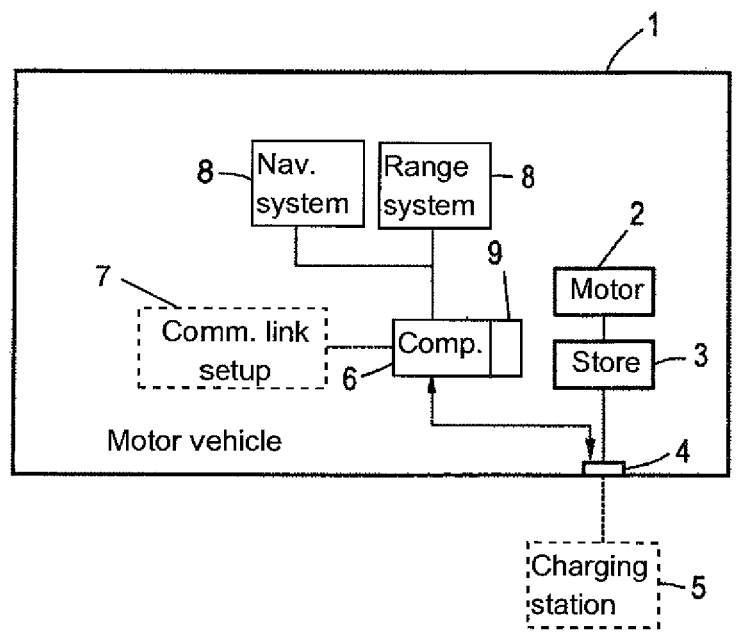
FIG. 1 a schematic diagram of a motor vehicle according to the invention.

FIG. 1 shows a schematic diagram of a motor vehicle 1 according to the invention. This is an electric-motor vehicle 1, i.e. an electric motor 2 is provided, which can in particular also be operated as a generator, and an energy store 3 associated with the electric motor 2, in particular a high voltage battery. For charging the energy store 3, the motor vehicle can be connected via a corresponding connection 4 to a charging station 5 which is indicated here only schematically and which is not part of the motor vehicle.

The motor vehicle further includes at least one computing device 6, which in the present exemplary embodiment has also access to the connection 4, in this example for exchanging communication signals for establishing a communication link with additional computing devices 6 of the other vehicles 1 by way of a server. Alternatively, in an embodiment that is not part of the present invention, the communication link which is primarily set up to the server, may also be set up via a wired link and/or preferably at least partially wirelessly, for example via a WLAN network, as indicated by the means 7 for setting up a communication link.

In the present case, the computing device 6 is assigned to different vehicle systems 8, for example to a navigation system and to a range calculation system, which demand computationally intensive computation processes for their results.

Furthermore, a memory device 9 for measurement data of different sensors, which are not shown here in detail, is assigned to the computing device 6. Measurement data recorded during a trip may thus be supplied for later analysis, here within such a computation process. These data are presently particularly camera images from a camera and measurement data from other environmental sensors. It will be understood that, depending on the computation processes to be carried out, a variety of other data may be stored in the memory device 9.

Figure 2:
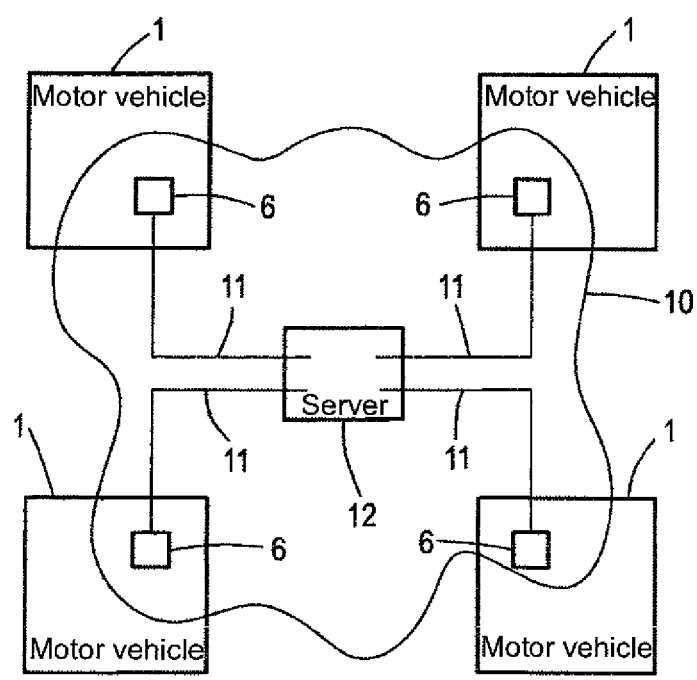
FIG. 2 a schematic diagram of a distributed computer system configured according to the invention.

The motor vehicle 1 is configured to be used with the method according to the invention by constructing a distributed computer system 10 as shown in FIG. 2 from various computing devices 6 of motor vehicles of the same manufacturer and, where appropriate, from those computing devices 6 located within a specific region dependent on the range of vehicles 1, when the motor vehicles 1 are being charged. This means here in practice that, whenever a motor vehicle 1 is connected to a charging station 5, a communication link 11 is set up to a server 12, i.e. to a central processing device, which is not associated with any motor vehicle 1. The server 12 can then add the computing device 6 to the cluster 10 when the cluster 10 meets the appropriate conditions and in particular has the same manufacturer, optionally also the same type of motor vehicle. As already mentioned, in some embodiments, distributed computer systems 10 may be associated with and established for a certain region, The computer devices 6 can communicate with each other via the server 12 and in particular perform complex computation processes. In coordination with the server 12, the needed computing power is distributed across the various computing devices 6. It should be noted here that the server 12 is not necessarily required, and that self-organizing distributed computer systems 10 that can operate without a server 12 may be used in the context of the present invention.

While computation processes, for example the high-precision calculation of a current range of a motor vehicle 1, can certainly relate only to a particular motor vehicle 1, wherein the other computing devices 6—so to speak—aid with the implementation of the computation process relating to a specific motor vehicle 1, it is in this embodiment also envisioned to perform at least one computation process that provides useful results for several motor vehicles and accesses a common database of the vehicles 1, wherein the corresponding data may be stored, for example, in the storage devices 9.

Presently, this relates to a process for updating map data of a navigation system, which can be used, for example, for range calculation. Here, measurement data also from other motor vehicles may be analyzed for routes, especially for routes that are within the range of the vehicles 1, in particular camera images when these are newer than the measurement data of the own vehicle 1. For example, current construction sites or change in traffic signs can be determined and associated with the map data. Such updating of map data need, of course, not only relate to a single motor vehicle 1, but can, when a new result is obtained, thereafter be applied to all motor vehicles 1.

It is also conceivable, however, in the context of the present invention to evaluate data from other motor vehicles in relation to a particular vehicle, for example, to evaluate newer camera images of the other vehicle for assessing whether changes have occurred compared to the own, archived camera images, and the like changes.

It should finally be noted that the server 12 in the present exemplary embodiment also renders the data exchanged between the computing devices 6 anonymous.

What is claimed is:

1. A method for performing at least one computation process in a motor vehicle having an electric motor and an energy store associated with the electric motor, the method comprising:

charging the energy store via a power supply line, while the energy store is being charged, establishing a communication link via the power supply line between a computing device of the motor vehicle and a computing device of at least one other motor vehicle whose energy store is also being charged, connecting the computing devices of the motor vehicles via the communication link to form a distributed computer system and distributing the at least one computation process among the computing devices of the motor vehicle and the at least one other motor vehicle, performing the at least one computation process with the distributed computer system, and further comprising the steps of evaluating measurement data with the computing device of the motor vehicle with a first accuracy during a trip of the motor vehicle, and subsequently post-processing the evaluated measurement data with the distributed computer system with a second accuracy that is greater than the first accuracy as part of the at least one computation process.

2. The method of claim 1, wherein the communication link is established through modulation of information.

3. The method of claims 1, further comprising using a server different from the computing devices of the motor vehicle and the at least one other motor vehicle for forming the distributed computer system or controlling distributed computer system, or both.

4. The method of claim 3, and further, with the server, rendering data exchanged as part of the at least one computation process anonymous.

5. The method of claim 1, wherein the distributed computer system only connects motor vehicles from a single manufacturer, or motor vehicles of a single type.

6. The method of claim 1, further comprising the step of pre-calculating with the at least one computation process with the distributed computer system data regarding a future trip of the motor vehicle.

7. The method of claim 1, wherein the at least one computation process uses data of several other motor vehicles.

8. The method of claim 1, wherein the at least one computation process performs updates of data of a navigation system or of measurement data forming the basis for calculating a driving range of the motor vehicle that the motor vehicle is capable of traveling with a current electric charge of the energy store, or both, by taking into consideration data from the several other motor vehicles.

* * * * *